United States Patent
Mylius et al.

(10) Patent No.: US 10,955,893 B2
(45) Date of Patent: Mar. 23, 2021

(54) DYNAMIC VOLTAGE MARGIN RECOVERY

(71) Applicant: Apple Inc., Cupertino, CA (US)

(72) Inventors: John H. Mylius, Gilroy, CA (US);
Conrad H. Ziesler, Seattle, WA (US);
Daniel C. Murray, Morgan Hill, CA
(US); Jong-Suk Lee, Sunnyvale, CA
(US); Rohit Kumar, Santa Clara, CA
(US)

(73) Assignee: APPLE INC., Cupertino, CA (US)

( * ) Notice: Subject to any disclaimer, the term of this patent is extended or adjusted under 35 U.S.C. 154(b) by 130 days.

(21) Appl. No.: 16/159,821

(22) Filed: Oct. 15, 2018

(65) Prior Publication Data

US 2019/0050043 A1     Feb. 14, 2019

Related U.S. Application Data

(63) Continuation of application No. 15/433,201, filed on Feb. 15, 2017, now Pat. No. 10,101,788, which is a
(Continued)

(51) Int. Cl.
*G06F 1/32* (2019.01)
*G06F 1/3209* (2019.01)
(Continued)

(52) U.S. Cl.
CPC ............ *G06F 1/3209* (2013.01); *G06F 1/324* (2013.01); *G06F 1/3206* (2013.01);
(Continued)

(58) Field of Classification Search
CPC ..................................... G06F 1/32; G06F 1/26
See application file for complete search history.

(56) References Cited

U.S. PATENT DOCUMENTS 5,719,800 A    2/1998  Mittal et al.
6,564,328 B1   5/2003  Grochowski et al.
(Continued)

FOREIGN PATENT DOCUMENTS

CN    101281415       10/2008
CN    101689070 A     3/2010
(Continued)

OTHER PUBLICATIONS

U.S. Appl. No. 13/924,180, filed Jun. 21, 2013, Jong-Suk Lee.
(Continued)

*Primary Examiner* — Kim Huynh
*Assistant Examiner* — Kevin M Stewart
(74) *Attorney, Agent, or Firm* — Kowert, Hood, Munyon, Rankin & Goetzel, P.C.; Lawrence J. Merkel

(57) ABSTRACT

In an embodiment, an integrated circuit includes multiple instances of a component (e.g. a processor) and a control circuit. The instances may be configured to operate in various modes. Some of the modes are incapable of presenting a worst-case load on the power supply. The control circuit may be configured to monitor the instances and detect the modes in which the instances are operating. Based on the monitoring, the control circuit may request to recover a portion of the voltage margin established for worst-case conditions in the instances. If the instances are to change modes, they may be configured to request mode change from the control circuit. If the mode change causes an increase in the current supply voltage magnitude (e.g. to restore some of the recovered voltage margin), the control circuit may cause the restore and permit it to complete prior to granting the mode change.

17 Claims, 8 Drawing Sheets

Related U.S. Application Data continuation of application No. 14/200,216, filed on Mar. 7, 2014, now Pat. No. 9,606,605.

(51) Int. Cl.
  *G06F 1/3296*  (2019.01)
  *G06F 1/3206*  (2019.01)
  *G06F 1/324*  (2019.01)
  *G06F 1/3287*  (2019.01)

(52) U.S. Cl.
  CPC ......... *G06F 1/3287* (2013.01); *G06F 1/3296* (2013.01); *Y02D 10/00* (2018.01)

(56) References Cited

U.S. PATENT DOCUMENTS

| | | |
|---|---|---|
| 7,437,581 B2 | 10/2008 | Grochowski et al. |
| 7,793,125 B2 | 9/2010 | Berry et al. |
| 7,915,910 B2 | 3/2011 | Von Kaenel |
| 8,010,822 B2 | 8/2011 | Marshall et al. |
| 8,190,930 B2 | 5/2012 | Herdrich et al. |
| 8,271,812 B2 | 9/2012 | De Cesare et al. |
| 8,381,006 B2 | 2/2013 | Flachs et al. |
| 8,510,740 B2 | 8/2013 | Salsbery |
| 8,756,442 B2 | 6/2014 | Naffziger et al. |
| 8,788,850 B1 | 7/2014 | Kaul et al. |
| 9,195,291 B2 | 11/2015 | Lee |
| 9,304,573 B2 | 4/2016 | Lee et al. |
| 9,606,605 B2 | 3/2017 | Mylius et al. |
| 9,703,354 B2 | 7/2017 | Lee et al. |
| 9,817,469 B2 | 11/2017 | Lee |
| 10,101,788 B2 | 10/2018 | Mylius et al. |
| 10,303,238 B2 | 5/2019 | Lee et al. |
| 2003/0065960 A1 | 4/2003 | Rusu et al. |
| 2003/0126478 A1 | 7/2003 | Burns et al. |
| 2003/0126479 A1 | 7/2003 | Burns et al. |
| 2003/0229814 A1 | 12/2003 | Garnett |
| 2004/0193934 A1 | 9/2004 | Kahn |
| 2005/0218871 A1 | 6/2005 | Kang et al. |
| 2006/0149975 A1 | 7/2006 | Rotem et al. |
| 2008/0036613 A1 | 2/2008 | Gaskins et al. |
| 2008/0082844 A1 | 4/2008 | Ghiasi et al. |
| 2008/0104425 A1 | 5/2008 | Gunther et al. |
| 2009/0031155 A1 | 1/2009 | Hofmann |
| 2009/0172424 A1 | 7/2009 | Cai et al. |
| 2009/0271646 A1 | 10/2009 | Talwar et al. |
| 2010/0037038 A1 | 2/2010 | Bieswanger et al. |
| 2010/0095137 A1 | 4/2010 | Bieswanger et al. |
| 2010/0115259 A1 | 5/2010 | Elsila |
| 2010/0268968 A1 | 10/2010 | Ghiasi |
| 2010/0312971 A1 | 12/2010 | Moallem |
| 2011/0080202 A1 | 4/2011 | Moore |
| 2011/0093724 A1 | 4/2011 | Park et al. |
| 2011/0093733 A1 | 4/2011 | Kruglick |
| 2011/0213950 A1 | 9/2011 | Mathieson et al. |
| 2011/0252251 A1 | 10/2011 | de Cesare |
| 2012/0017104 A1 | 1/2012 | Siba |
| 2012/0036375 A1 | 2/2012 | Puschini Pascual |
| 2012/0054519 A1 | 3/2012 | Branover et al. |
| 2012/0079290 A1 | 3/2012 | Kumar |
| 2012/0110352 A1 | 5/2012 | Branover |
| 2012/0117403 A1 | 5/2012 | Bieswanger |
| 2012/0159198 A1 | 6/2012 | Naffziger |
| 2012/0166842 A1 | 6/2012 | Sur |
| 2013/0007413 A1 | 1/2013 | Thomson et al. |
| 2013/0024713 A1 | 1/2013 | Bajic et al. |
| 2013/0097415 A1 | 4/2013 | Li et al. |
| 2013/0155081 A1 | 6/2013 | Khodorkovsky |
| 2013/0196709 A1 | 8/2013 | Nho |
| 2013/0238912 A1 | 9/2013 | Priel |
| 2013/0246820 A1 | 9/2013 | Branover |
| 2013/0254562 A1* | 9/2013 | Thakkar ................... G06F 1/26 713/300 |
| 2013/0311782 A1 | 11/2013 | Erlingsson |
| 2014/0025937 A1 | 1/2014 | Faasse |
| 2014/0053009 A1 | 2/2014 | Semin |
| 2014/0181537 A1* | 6/2014 | Manne ................. G06F 1/3296 713/300 |
| 2014/0337646 A1* | 11/2014 | Varma ................... G06F 1/3206 713/322 |
| 2015/0241955 A1 | 8/2015 | Kosnocky |
| 2015/0253836 A1 | 9/2015 | Mylius |
| 2016/0282930 A1 | 9/2016 | Ramachandran |

FOREIGN PATENT DOCUMENTS

| | | |
|---|---|---|
| CN | 101765822 A | 6/2010 |
| CN | 102317866 A | 1/2012 |
| CN | 102365606 A | 2/2012 |
| CN | 102520754 | 6/2012 |
| CN | 103019876 | 4/2013 |
| CN | 103207525 A | 7/2013 |
| EP | 2348410 | 7/2011 |
| EP | 2590051 A2 | 5/2013 |
| KR | 1020020062986 | 7/2002 |
| KR | 1020130047577 | 4/2013 |
| TW | 299118 B | 7/2008 |
| TW | 201145002 | 12/2011 |
| TW | 201329686 | 7/2013 |
| WO | 2009015326 A2 | 1/2009 |
| WO | 2011147777 | 12/2011 |

OTHER PUBLICATIONS

U.S. Appl. No. 13/924,164, filed Jun. 21, 2013, Jong-Suk Lee.
Office Action, U.S. Appl. No. 13/924,164, filed Jun. 21, 2013; dated Jun. 19, 2015, 14 pages.
Office Action, U.S. Appl. No. 13/924,180, filed Jun. 21, 2013: dated Jun. 20, 2015, 28 pages.
Invitation to Pay Additional Fees in International Application No. PCT/US2015/015779, dated May 4, 2015, 6 pages.
Office Action in ROG (Taiwan) Patent Application No. 104106392 dated Oct. 27, 2015, 8 pages.
Office Action, Korean Intellectual Property Office Notice of Preliminary Rejection, Korean Patent Application No. 10-2016-7023546, dated Aug. 31, 2017, 6 pages.
Communication pursuant to Art, European Patent Office, EP Patent Application No. 15708950.9, dated Feb. 26, 2018, 11 pages.
Office Action, Chinese Patent Office, Chinese Application for Invention No. 201580006847.3, dated Mar. 23, 2018, 14 pages.

* cited by examiner

DYNAMIC VOLTAGE MARGIN RECOVERY

This application is a continuation of U.S. patent application Ser. No. 15/433,201, filed Feb. 15, 2017 and now U.S. Pat. No. 10,101,788, which is a continuation of U.S. patent application Ser. No. 14/200,216, filed Mar. 7, 2014 and now U.S. Pat. No. 9,606,605, which are hereby incorporated by reference in its entirety.

BACKGROUND

Technical Field

Embodiments disclosed herein are related to the field of power management in integrated circuits.

Description of the Related Art

A given integrated circuit can include a variety of components, and in some cases multiple instances of the same component. For example, a system on a chip (SOC) can include one or more processors forming the central processing units (CPUs) of the SOC, one or more memory controllers, various peripheral circuits such as graphics devices, display controllers, image processing components, audio processing components, networking components, peripheral interface controllers, etc. Each component is designed to operate at a specified clock frequency (or, more briefly, frequency) and a corresponding power supply voltage magnitude. Different components can have different operating points (frequency/power supply voltage magnitude pairs), and if the voltage magnitudes differ during use there can be different power supply voltage planes in the integrated circuit.

The actual power supply voltage magnitude supplied to the component during use is greater than the power supply voltage magnitude for which the component is designed. A significant portion of the difference (referred to as the voltage margin, or simply margin) accounts for potential voltage loss (referred to as voltage drop or droop). Particularly, significant sources of power supply voltage variation during use are current-resistance (IR) drop due to resistance between the power management unit that supplies power to the integrated circuit and the loads within the integrated circuit. The resistance can include resistance in the conductors on the board, resistance in the conductors between the pins of the integrated circuit package and the loads within the integrated circuit (e.g. the components of the integrated circuit), etc. The greater the current drawn by the component, the higher the IR drop. Additionally, significant changes in the current causes transient voltage droop (referred to as L*di/dt voltage droop, as the combination of inductance in the system and the transient current changes cause the droop). In order to ensure that components operate properly under all conditions, the worst-case current and di/dt conditions are assumed for the component and the required power supply voltage magnitude is increased to ensure that even if the worst-case conditions are occurring, the power supply voltage magnitude experienced by the component is sufficient for correct operation. When multiple instances of a component are included (e.g. multiple processors), all of the instances are assumed to operate at worst-case concurrently and a corresponding voltage margin is determined.

Maintaining a higher power supply voltage magnitude than otherwise required sacrifices power and high end performance. The IR drop and L*di/dt droop are highly workload dependent, varying with the number of instances that are active and whether the workload is utilizing the most power intensive portions of the instances. Thus, at times in which the instances are not presenting worst-case loads to the power supply, the voltage margin is larger than required and power consumption is higher than necessary.

SUMMARY

In an embodiment, an integrated circuit includes multiple instances of a component and a control circuit. The instances may be configured to operate in various modes, some of which are incapable of presenting a worst-case load on the power supply. The control circuit may be configured to monitor the instances and detect that modes in which the instances are operating. Based on the monitoring, the control circuit may request to recover a portion of the voltage margin established for worst-case conditions in the instances. If the instances are to change modes, they may be configured to request mode change from the control circuit. If the mode change causes an increase in the current supply voltage magnitude (e.g. to restore some of the recovered voltage margin), the control circuit may cause the restore and permit it to complete prior to granting the mode change. In various embodiments, the voltage margin recovery may occur via reduction of the power supply voltage magnitude or increase of the frequency at the same power supply voltage magnitude. The effective power/performance ratio may be more optimal and may vary dynamically with conditions, in some embodiments.

In an embodiment, the component may be the processor (CPU) of an SOC. The processor may include instruction execution pipelines to execute various types of instruction operations. In certain modes, one or more of the instruction execution pipelines may be disabled, which may ensure that worst-case power supply load is prevented. To enable or disable pipelines, the processor may be configured to request permission from the control circuit, which may be configured to monitor the modes of each of the processor instances to determine if the voltage margin recovery is to be restored (partially or wholly) and to restore the recovered voltage margin prior to granting the request.

BRIEF DESCRIPTION OF THE DRAWINGS

The following detailed description makes reference to the accompanying drawings, which are now briefly described.

Figure 1:
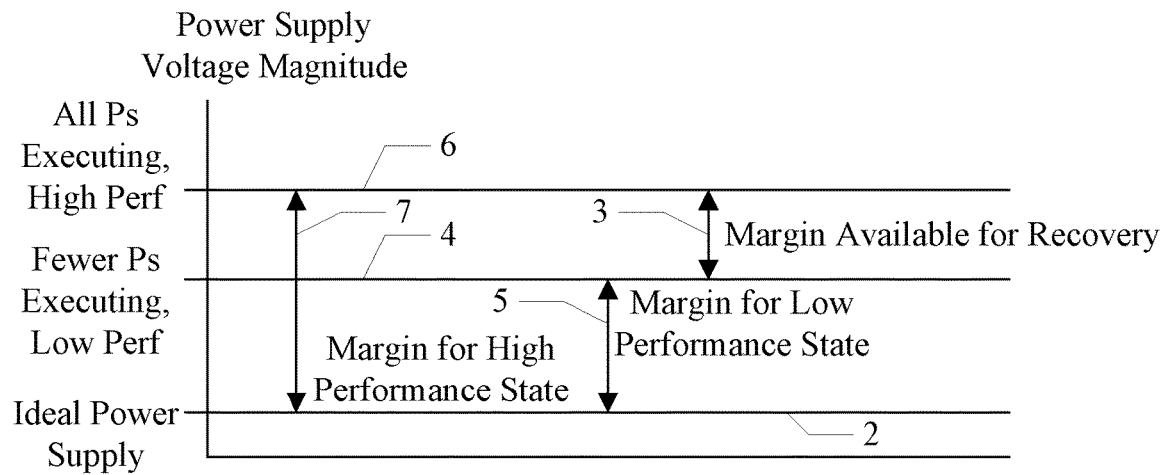
FIG. 1 is a diagram illustrating voltages and potential voltage margin recovery.

While the embodiments disclosed herein are susceptible to various modifications and alternative forms, specific embodiments are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) interpretation for that unit/circuit/component.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

DETAILED DESCRIPTION OF EMBODIMENTS

Turning now to FIG. 1, a diagram is shown illustrating minimum power supply voltage magnitudes that would be safe to use for different operating modes of the processors in an SOC, such as that shown in FIG. 2 and discussed in more detail below. Line 2 represents the minimum power supply voltage magnitude at which the processors are designed to operate correctly. That is, in the absence of power supply voltage variation due to IR drop, L*di/dt voltage droop, and other such factors, the power supply voltage magnitude represented by line 2 would be sufficient to ensure correct operation of the processors. Viewed in another way, line 2 is the power supply voltage magnitude that would be sufficient on an ideal power supply (no impedance and infinite current capacity) supplying power directly to the processors.

Line 6 represents the minimum safe power supply voltage magnitude if all the processors are active, executing in a high performance mode which permits worst-case power supply load from each processor. The supply voltage magnitude represented by line 6 includes a margin (represented by line 7) over the ideal supply minimum to ensure correct operation with any supply voltage variation introduced due to "real world" factors such as impedance (e.g. resistance and inductance) in the power supply distribution planes and interconnect to the package pins, L*di/dt transient effects, etc.

Line 4 represents an intermediate power supply voltage magnitude. The intermediate level would be safe to use if the worst-case power supply load is not possible from the processors (or at least some of the processors). For example, fewer than all of the processors may be executing (e.g. some may be clock gated or power gated). If not all of the processors are executing, then even if the executing processors are in the high performance mode, the total load on the power supply may be less than the worst-case possible load if all the processors were executing in the high performance mode. Additionally or alternatively, one or more of the processors may be executing in a low performance state that does not permit the worst-case load on the power supply load to be presented by those processors. Both inactive processors and low performance state processors may be factors in the reduced safe power supply voltage. Because of these factors, a lower margin (represented by the line 5 in FIG. 1) may be supported.

Thus, if the modes of the processors were externally controllable, so that the transition between modes may not occur unless the external controller permits the transitions, a portion of the voltage margin that has been built-in to the power supply voltage magnitude may be recovered (represented by the line 3 in FIG. 1). Because power supply voltage magnitude changes take some time to perform, actually recovering the available margin may be predicated on the ability to externally control the transition of processors to a higher performance (and potentially higher power supply load) mode. Processors that are power gated need to be powered on to transition to a higher power mode (e.g. any "on" mode), and thus that transition may be controlled externally since the power supply is controlled externally. For clock-gated cases and cases in which the state of the processor is a lower performance, but still executing, mode may be controlled via the addition of a communication between the processor and the external controlling logic (e.g. the automatic power state controller described below). The processor may detect that a transition to a different performance state is desired, and may request the transition from the automatic power state controller. The automatic power state controller may ensure that a power supply voltage magnitude increase is not needed to permit the transition, or may cause the power supply voltage increase, then may permit the transition to occur. Transitions to lower performance modes may be permitted and, if applicable, a lower power supply voltage magnitude may be established. The lower power supply voltage magnitude need not be established before permitting the transition, because the processor will operate properly at the higher voltage magnitude.

With the controllability provided by the interface between the processors and the automatic power state controller, the voltage margin (or a portion thereof) may be safely and dynamically recovered based on the modes in which the processors are operating. In this case, the voltage margin may be changed while the processor frequency remains constant. In another embodiment, processor frequency may be increased when the processor modes indicate less than worst-case load. In still another embodiment, a combination of power supply voltage decrease and frequency increase may be implemented. For example, a boost state may be implemented for cases in which few processors are executing, but they are executing in the high performance mode. In the boost state, a higher frequency may be used. The automatic power state controller may monitor mode transitions from other processors, and may transition to a different state if the combination of modes presents the potential for power supply load greater than the boost state may safely support. In the other modes, voltage margin recovery may be performed by reducing the power supply voltage magnitude. Other embodiments may include more boost states if desired. The recovery of margin by decreasing power supply voltage magnitude may be referred to herein as dynamic voltage margin recovery-voltage (DVMR-V). The recovery of margin by increasing the frequency may be referred to as DVMR-Frequency (DVMR-F).

While the above discussion and various embodiments below describe the recovery of voltage margin for processors, DVMR may be applied to other components of an integrated circuit as well. Generally, any component that supports more than one mode, and at least one of the modes ensures that worst-case power supply load will not be presented by the component, may employ DVMR. Transitions between the modes may be controllable as discussed above, using an interface between the component and the automatic power state controller. Multiple components may be controllable in this fashion, similar to the above discussion and the description below of multiple processors. Generally, a component may be any discretely-defined circuitry that performs a defined set of functionality in the overall integrated circuit. There may be multiple instances of a component (e.g. multiple processors). The instances may be substantially identical, although there may be some differences. For example, instances of the processors may include a CPU ID that identifies which instance the processor is. The CPU ID for each processor may be different.

Figure 2:
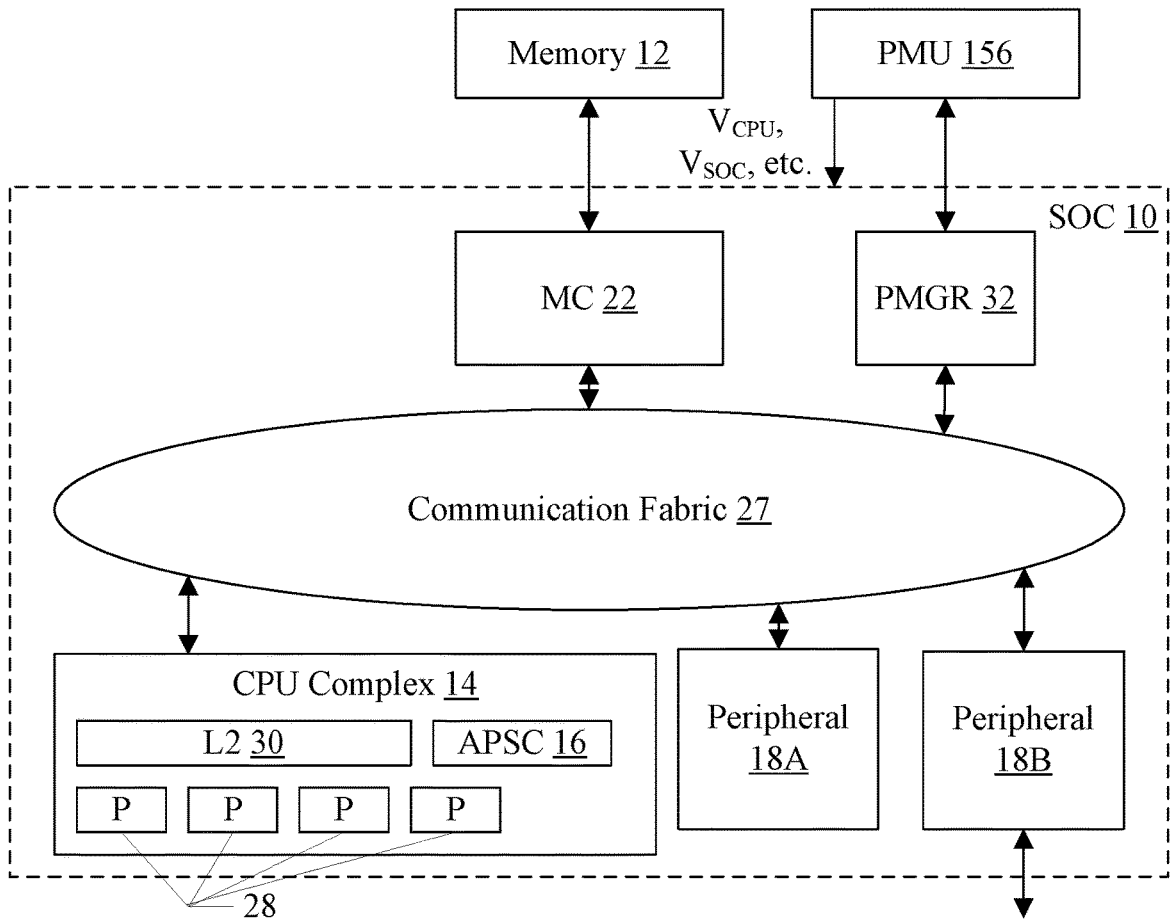
FIG. 2 is a block diagram of one embodiment of a system on a chip (SOC).

Turning now to FIG. 2, a block diagram of one embodiment of an SOC 10 is shown coupled to a memory 12 and a power management unit (PMU) 156. As implied by the name, the components of the SOC 10 may be integrated onto a single semiconductor substrate as an integrated circuit "chip." In some embodiments, the components may be implemented on two or more discrete chips in a system. However, the SOC 10 will be used as an example herein. In the illustrated embodiment, the components of the SOC 10 include a central processing unit (CPU) complex 14, peripheral components 18A-18B (more briefly, "peripherals"), a memory controller 22, a power manager (PMGR) 32, and a communication fabric 27. The components 14, 18A-18B, 22, and 32 may all be coupled to the communication fabric 27. The memory controller 22 may be coupled to the memory 12 during use. In the illustrated embodiment, the CPU complex 14 includes one or more processors 28, a level two (L2) cache 30, and an automatic power state controller (APSC) 16.

The CPU processors 28 may serve as the CPU of the SOC 10. The CPU of the system includes the processor(s) that execute the main control software of the system, such as an operating system. Generally, software executed by the CPU during use may control the other components of the system to realize the desired functionality of the system. The processors 28 may also execute other software, such as application programs. The application programs may provide user functionality, and may rely on the operating system for lower level device control. Accordingly, the processors 28 may also be referred to as application processors. The CPU complex 14 may further include other hardware such as the L2 cache 30 and/or and interface to the other components of the system (e.g. an interface to the communication fabric 27).

The APSC 16 may be configured to monitor the active processors 28 and the modes of the active processors 28. If voltage margin, or a portion thereof, may be reclaimed based on the monitored activity, the APSC 16 may perform the DVMR-V or DVMR-F to recover the available margin.

In one embodiment, the worst-case power consumption may occur in a processor 28, e.g., when code containing the highest power-consuming instructions is executed repeatedly in the processor 28. Which instructions are the highest power-consuming instructions may vary from implementation to implementation of the processors 28. In some cases, the highest-power consuming instructions may be a particular type of instruction (e.g. floating point instructions may be higher power-consuming than media or integer instructions, or the media instructions may be the highest power-consuming, etc.). Particular instructions within the type of instruction may be higher than others (e.g. multiply-add floating point instructions may be higher power-consuming than other floating point instruction).

An instruction type, in this context, may refer to the general operation of the instruction and/or the operand type operated on by the instruction. For example, instruction types may include load/store instructions, which read and write data from and to memory. Instruction types may further include arithmetic/logic instructions that operate on specific operand types (e.g. floating point, vector, integer, etc.).

For the highest power-consuming instruction type, each processor 28 may include multiple execution pipelines that execute instruction operations (ops) of that type. The processor 28 may be configured to enable/disable a subset of the pipelines. Accordingly, the processor modes that are tracked by the APSC 16 (and which the processor 28 is configured to request permission to transition between) may include how many of the pipelines are enabled. If multiple pipelines are enabled, the worst-case power consumption of the processor 28 may be higher. If fewer pipelines are enabled, the worst-case power consumption may be lower.

The processor 28 may be configured to monitor the mix of instructions being executed. If the higher power consuming ops are increasing in frequency and one or more of the execution pipelines are disabled, the processor 28 may determine that one or more of the execution pipelines should be enabled. The processor 28 may use the interface to the APSC 16 to request the enabling of the pipelines, and may enable the pipelines when granted. Similarly, if the higher power consuming ops are decreasing in frequency, the processor 28 may determine that one or more execution pipelines should be disabled and may request the disabling of pipelines from the APSC 16. By communicating the enable/disable of pipelines to the APSC 16, the processors 28 may permit the APSC 16 to control the maximum power supply load of the processors 28 (and thus may permit voltage margin to be reclaimed).

An operating point may refer to a combination of power supply voltage magnitude and operating frequency for the CPU complex 14. The operating frequency may be the frequency of the clock that clocks the processors 28. In some cases, other circuitry in the CPU complex 14 may operate at a lower clock frequency derived from the operating frequency (e.g. the L2 cache 30 may operate at a lower clock frequency). The operating frequency may also be referred to as the clock frequency or simply the frequency. The operating point may also be referred to as an operating state or power state.

Generally, a processor may be active if it is powered up. The processor may be available for instruction execution with little delay (e.g. it may be clock gated, but may be ungated if instructions are ready to execute). A processor may be inactive if it is powered off or in another low power state in which a significant delay may be experienced before instructions may be executed. For example, if the processor requires a reset or a relock of a phase lock loop (PLL), it may be inactive even if it remains powered.

Generally, a processor may include any circuitry and/or microcode configured to execute instructions defined in an instruction set architecture implemented by the processor. Processors may encompass processor cores implemented on an integrated circuit with other components as a system on a chip (SOC 10) or other levels of integration. Processors may further encompass discrete microprocessors, processor cores and/or microprocessors integrated into multichip module implementations, processors implemented as multiple integrated circuits, etc.

The memory controller 22 may generally include the circuitry for receiving memory operations from the other components of the SOC 10 and for accessing the memory 12 to complete the memory operations. The memory controller 22 may be configured to access any type of memory 12. For example, the memory 12 may be static random access memory (SRAM), dynamic RAM (DRAM) such as synchronous DRAM (SDRAM) including double data rate (DDR, DDR2, DDR3, DDR4, etc.) DRAM. Low power/mobile versions of the DDR DRAM may be supported (e.g. LPDDR, mDDR, etc.). The memory controller 22 may include queues for memory operations, for ordering (and potentially reordering) the operations and presenting the operations to the memory 12. The memory controller 22 may further include data buffers to store write data awaiting write to memory and read data awaiting return to the source of the memory operation. In some embodiments, the memory controller 22 may include a memory cache to store recently accessed memory data. In SOC implementations, for example, the memory cache may reduce power consumption in the SOC by avoiding reaccess of data from the memory 12 if it is expected to be accessed again soon. In some cases, the memory cache may also be referred to as a system cache, as opposed to private caches such as the L2 cache 30 or caches in the processors 28, which serve only certain components. Additionally, in some embodiments, a system cache need not be located within the memory controller 22.

The peripherals 18A-18B may be any set of additional hardware functionality included in the SOC 10. For example, the peripherals 18A-18B may include video peripherals such as an image signal processor configured to process image capture data from a camera or other image sensor, display controllers configured to display video data on one or more display devices, graphics processing units (GPUs), video encoder/decoders, scalers, rotators, blenders, etc. The peripherals may include audio peripherals such as microphones, speakers, interfaces to microphones and speakers, audio processors, digital signal processors, mixers, etc. The peripherals may include interface controllers for various interfaces external to the SOC 10 (e.g. the peripheral 18B) including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included.

The communication fabric 27 may be any communication interconnect and protocol for communicating among the components of the SOC 10. The communication fabric 27 may be bus-based, including shared bus configurations, cross bar configurations, and hierarchical buses with bridges. The communication fabric 27 may also be packet-based, and may be hierarchical with bridges, cross bar, point-to-point, or other interconnects.

The PMGR 32 may be configured to control the supply voltage magnitudes requested from the PMU 156. There may be multiple supply voltages generated by the PMU 156 for the SOC 10. For example, illustrated in FIG. 2 are a $V_{CPU}$ and a $V_{SOC}$. The $V_{CPU}$ may be the supply voltage for the CPU complex 14. The $V_{SOC}$ may generally be the supply voltage for the rest of the SOC 10 outside of the CPU complex 14. There may be multiple supply voltages for the rest of the SOC 10, in some embodiments. In some embodiments, there may also be a memory supply voltage for various memory arrays in the CPU complex 14 and/or the SOC 10. The memory supply voltage may be used with the voltage supplied to the logic circuitry (e.g. $V_{CPU}$ or $V_{SOC}$), which may have a lower voltage magnitude than that required to ensure robust memory operation. In some embodiments, logic local to various components (e.g. the APSC 16) may control the power states of the components, including power up and power down and various other operating points for those components that support more than one operating point. In other embodiments, the PMGR 32 may control power up and power down of other components of the SOC 10, or a combination of local control for some components and PMGR control for other components may be supported. The PMGR 32 may be under direct software control (e.g. software may directly request the power up and/or power down of components) and/or may be configured to monitor the SOC 10 and determine when various components are to be powered up or powered down.

The PMU 156 may generally include the circuitry to generate supply voltages and to provide those supply voltages to other components of the system such as the SOC 10, the memory 12, various off-chip peripheral components (not shown in FIG. 2) such as display devices, image sensors, user interface devices, etc. The PMU 156 may thus include programmable voltage regulators, logic to interface to the SOC 10 and more particularly the PMGR 32 to receive voltage requests, etc.

It is noted that the number of components of the SOC 10 (and the number of subcomponents for those shown in FIG. 2, such as within the CPU complex 14) may vary from embodiment to embodiment. There may be more or fewer of each component/subcomponent than the number shown in FIG. 2.

Figure 3:
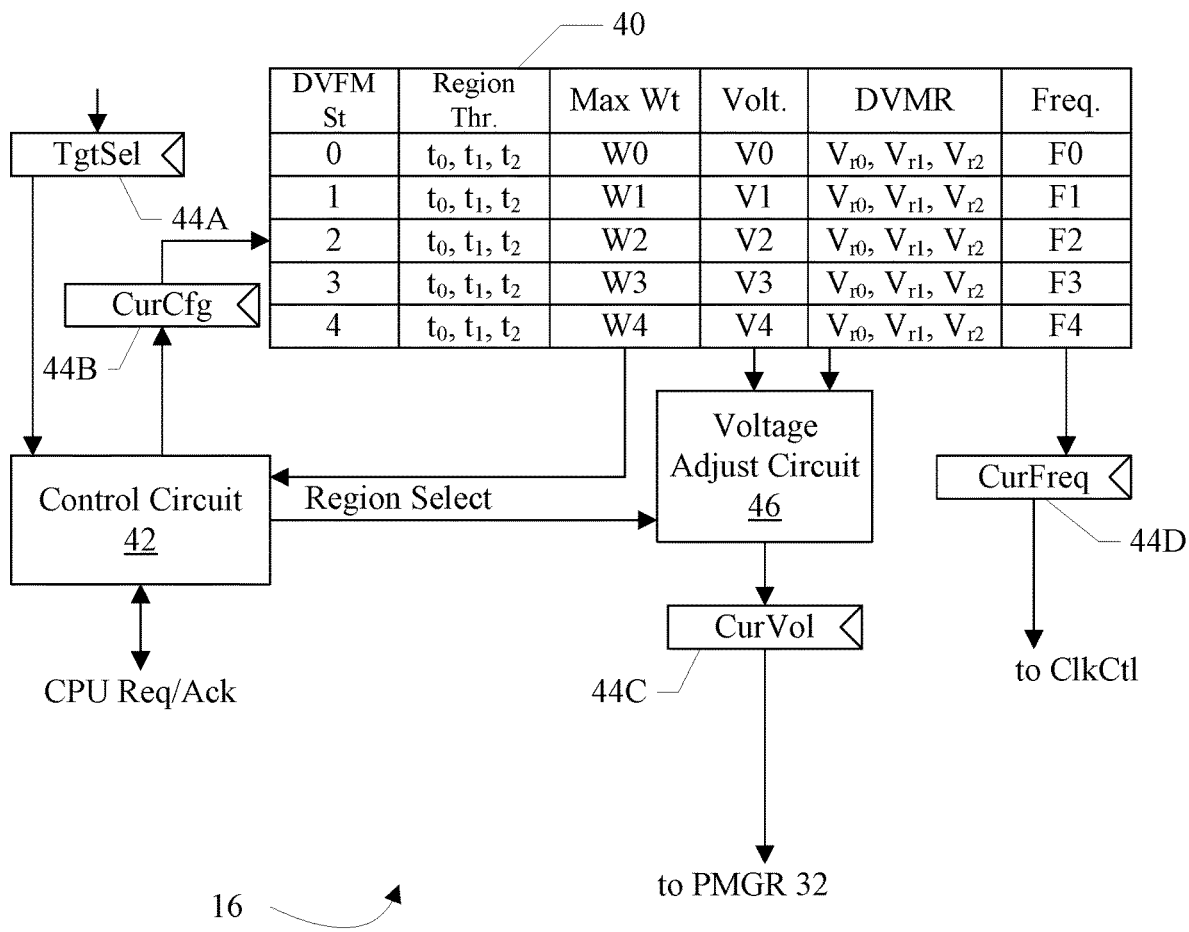
FIG. 3 is a block diagram of one embodiment of an automatic power state controller (APSC) shown in FIG. 2.

FIG. 3 is a block diagram of one embodiment of the APSC 16. In the illustrated embodiment, the APSC 16 includes a dynamic voltage and frequency management (DVFM) table 40, a control circuit 42, registers 44A-44D, and a voltage adjust circuit 46. The DVFM table 40 is coupled to the registers 44B and 44D, the control circuit 42, and the voltage adjust circuit 46. The voltage adjust circuit 46 is coupled to the register 44C. The control circuit 42 is coupled to the registers 44A-44B, to receive CPU request events, to provide CPU acknowledge events, and to provide a region selection to the voltage adjust circuit 46. The outputs of the registers 44C and 44D are conveyed to the PMGR 32 and a clock control (ClkCtl) unit (not shown), respectively.

The DVFM table 40 includes multiple entries that may be programmed with data describing various operating points or states (indicated by the DVFM state column in FIG. 3). The register 44A may be programmed with a target operating point selection (TgtSel) from software, identifying the desired operating point for the CPU complex 14. The target operating point may serve as a ceiling for cases in which DVFM-F is implemented. DVFM-V may be implemented by dynamically varying the requested power supply voltage magnitude based on data in the selected entry. Accordingly, the control circuit 42 may be configured to write either the target operating point selection or a selection generated based on DVFM-F to the current configuration registers 44B. The register 44B may be coupled to a read port on the table 40, and the data from the corresponding entry may be output by the table 40.

The data in each entry of the DVFM table 40 may describe an operating point. The data may include an indication of the power supply voltage magnitude (Volt. column in FIG. 3) and the operating frequency (Freq. column in FIG. 3). The power supply voltage magnitude may be the "safe" voltage for the corresponding frequency. That is, if the CPU complex 14 is powered at the safe voltage, correct operation may be achieved even in the case that all of the processors 28 present a worst-case load on the power supply. The data may further include indications of reductions from the safe power supply voltage magnitude that may be applied by DVFM-V. Specifically, in the illustrated embodiment, three reductions may be supported per operating point: $V_{r0}$, $V_{r1}$, and $V_{r2}$. Each of the voltage reductions may correspond to a "region" of modes of the processor 28, representing different maximum loads that the processors 28 as a whole may present in the combination of modes currently in effect in the processors. The regions may be measured in any desired fashion. A corresponding set of thresholds for the regions ($t_0$, $t_1$, and $t_2$) may be programmed into the state entries and may be compared to the current region measurement to determine the region (and thus the correct voltage reduction to select).

In the present embodiment, the regions may be measured in terms of processor "weights." The weights may represent the modes of the processors, with larger weights indicating a higher possible load and lower weights representing lower possible loads. An inactive processor 28 may have a weight of zero. In an embodiment in which the execution pipelines that execute the high power-consuming ops can be disabled, higher numbers of enabled high power-consuming execution pipelines result in higher weights. For example, in one embodiment, an active processor 28 may have a mode in which one high power execution pipeline is enabled. Such a configuration may have a weight of one. The active processor 28 may have another mode in which all execution pipelines are enabled. Such a configuration may have weight of 2 (or 3, or 4, depending on the relative power consumption difference and/or the number of execution pipelines). The control circuit 42 may be configured to maintain a running total of the current processor weight (e.g. the sum of the weights of the processors 28). As the processors 28 request mode transitions, the control circuit 42 may be configured to adjust the running total weight. The control circuit 42 may be configured to compare the total weight to the thresholds to determine the current region, and the control circuit 42 may generate the region select signal to the voltage adjust circuit 46 to indicate the current region.

Figure 9:
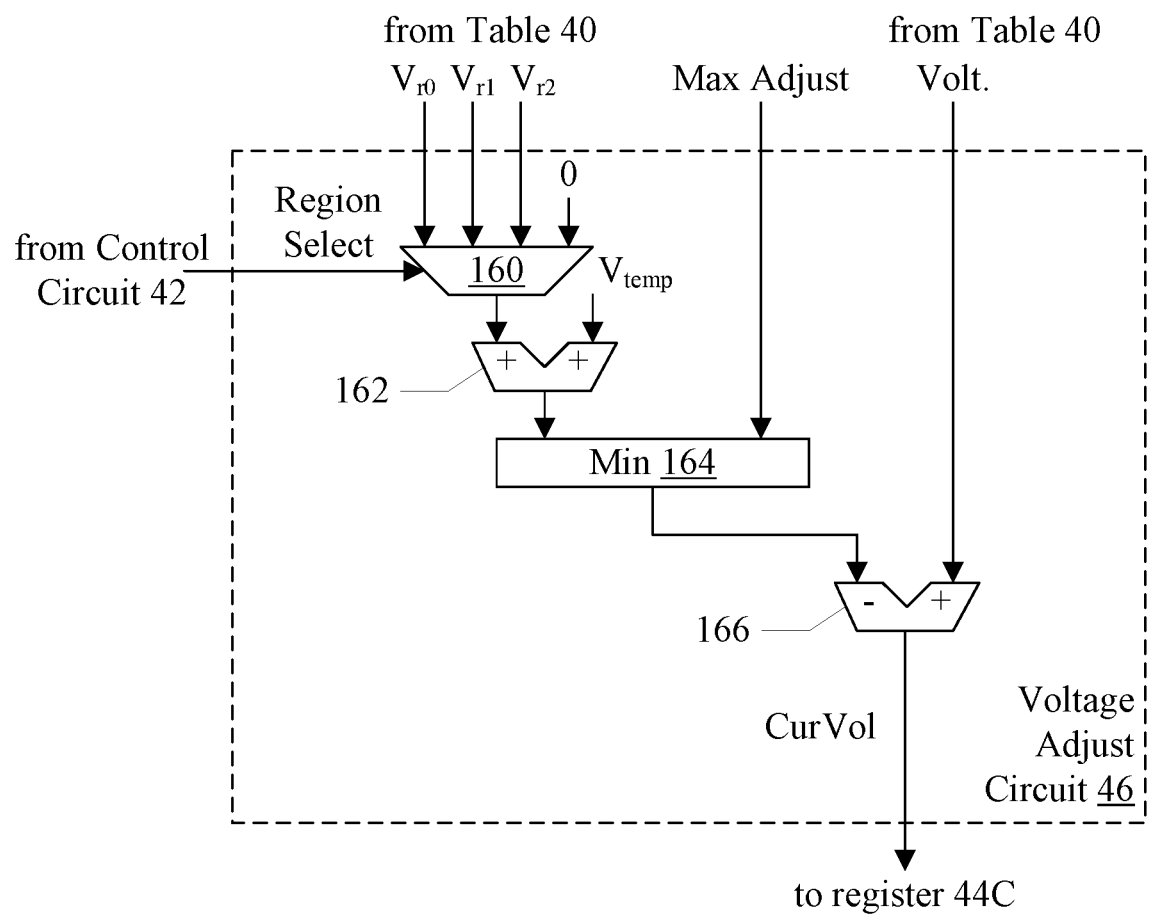
FIG. 9 is a block diagram of one embodiment of the voltage adjust circuit shown in FIG. 3.

Responsive to the region select signal, the voltage adjust circuit may be configured to select the corresponding voltage adjustment ($V_{r0}$, $V_{r1}$, $V_{r2}$, or 0 if in region 3) to subtract from the safe power supply voltage magnitude (from the Volt. field of the entry) to generate the current requested power supply voltage magnitude. The current requested magnitude may be stored in the register 44C and transmitted to the PMGR 32. In an embodiment, the voltage adjustments for DVFM may be implemented in parallel with thermal voltage adjustments based on operating temperatures. The total adjustment from all sources may be limited to a maximum, which may be programmed in to the APSC 16 in an embodiment. For example, FIG. 9 is a block diagram of one embodiment of the voltage adjust circuit 46. In the illustrated embodiment, a multiplexor (mux) 160 is coupled to receive the voltage adjustments from the table 40 ($V_{r0}$, $V_{r1}$, $V_{r2}$, or 0 if in region 3) and the region select from the control circuit 42. The mux 160 may select the voltage adjustment responsive to the region select and output the selected voltage adjustment to an adder 162, which may also receive the voltage adjustment due to temperature ($V_{temp}$). $V_{temp}$ may be provided by temperature compensation logic (not shown). In general, there may be any number of sources of voltage adjustments in various embodiments, and the adjustments from these other sources may be added to the adjustment from the table 40 to arrive at a total adjustment. As mentioned above, the total adjustment may be limited to a maximum (Max Adjust in FIG. 9), which may be accomplished via the min select circuit 164 that is coupled to receive the output of the adder 162 and the maximum adjustment. The maximum adjustment may also be stored in the table 40, in an embodiment, or may be programmed in a register or otherwise provided in other embodiments. The resulting adjustment from the min select circuit 164 may be coupled to an input on an adder 166, which may subtract the resulting adjustment from the voltage magnitude provided from the table 40 to generate the current requested voltage magnitude (CurVol in FIG. 9).

A maximum weight may be supplied in the entry as well (Max Wt field in FIG. 3). The control circuit may be configured to limit the total running weight of the processors to the maximum weight. In an embodiment, the maximum weight may be used as part of the DVFM-F implementation. If the entry is a boosted frequency entry, the control circuit 42 may be configured to use the maximum weight to determine that a change to a lower DVFM state is to be made so that the desired transition may be made in the processors 28. That is, the boosted frequency may no longer be used because the activity in the processors is increasing, which requires that the boosted frequency be reduced. In such a case, the control circuit 42 may be configured to reduce the state indicated in the register 44B, resulting in a power supply voltage and/or frequency change.

Figure 4:
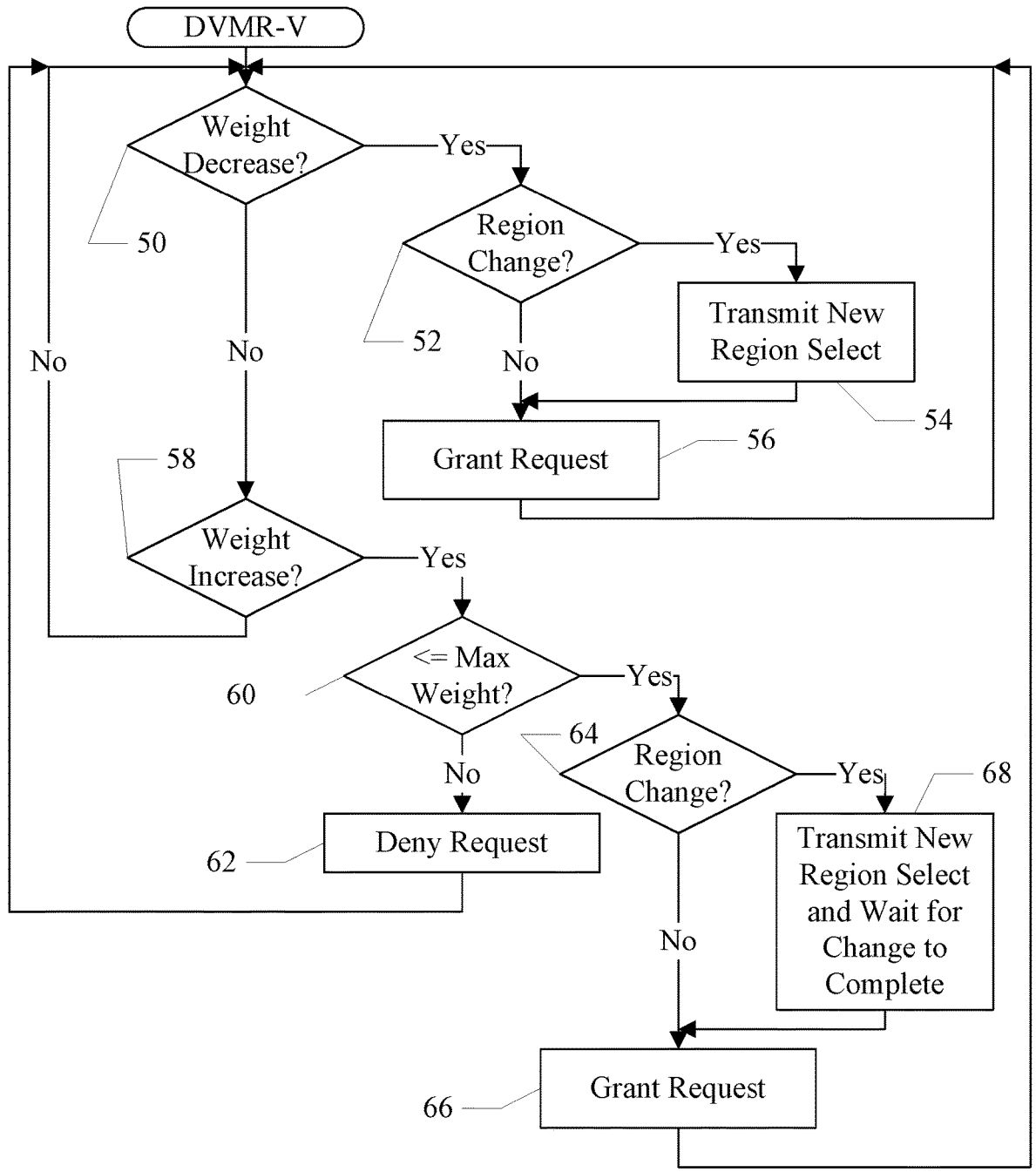
FIG. 4 is a flowchart illustrating operation of one embodiment of the APSC to perform voltage margin recovery.

Turning now to FIG. 4, a flowchart is shown illustrating operation of one embodiment of the APSC 16 to implement DVMR-V. While the blocks are shown in a particular order for ease of understanding, other orders may be used. Blocks may be performed in parallel in the combinatorial logic circuitry in the APSC 16. Blocks, combinations of blocks, and/or the flowchart as a whole may be pipelined over multiple clock cycles. The APSC 16 may be configured to implement the operation shown in FIG. 4.

The operation of FIG. 4 may be implemented in response to a request from one of the processors 28 to transition between modes. The request to transition may also include a request to power up or power down a processor. A power up/power down request may be transmitted by the PMGR 32 or other circuitry that manages waking up and shutting down processors 28. Powering down may cause a decrease in weight and powering up may cause an increase in weight. If the requested transition causes a decrease in weight (decision block 50, "yes" leg), the control circuit 42 may be configured to determine if the decreased weight results in a region change (decision block 52). That is, the control circuit 42 may be configured to compare the decreased weight to the region thresholds from the current DVFM state entry to determine if the region changes. If so (decision block 52, "yes" leg), the control circuit 42 may be configured to transmit the new region selection to the voltage adjust circuit

46 (block 54). In either case, the control circuit 42 may be configured to grant the request from the processor 28 (block 56), because the current configuration may be safe to operate the reduced load. That is, the transition to the reduced voltage need not occur prior to granting the request.

If the request causes an increase in weight (decision block 58, "yes" leg), the control circuit 42 may be configured to compare the increased weight to the max weight and the region thresholds (decision blocks 60 and 64). If the increased weight is not less than or equal to the max weight (decision block 60, "no" leg), the control circuit 42 may be configured to deny the requested change (block 62). Denying the requested change may include leaving the weight at the current setting. In an embodiment, it may be expected that the max weight is not set lower than the maximum possible weight. If the increased weight is less than or equal to the max weight (decision block 60, "yes" leg) and the increased weight does not cause a region change (decision block 64, "no" leg), the control circuit 42 may be configured to grant the request (block 66). If the increased weight is less than or equal to the max weight (decision block 60, "yes" leg) and the increased weight causes a region change (decision block 64, "yes" leg), the control circuit 42 may be configured to transmit the new region selection (block 68). In this case, the control circuit 42 may be configured to wait for the change to the new power supply voltage magnitude is complete before granting the request (block 66), since the higher power supply voltage magnitude may be needed to safely manage the potentially higher power supply load.

Figure 5:
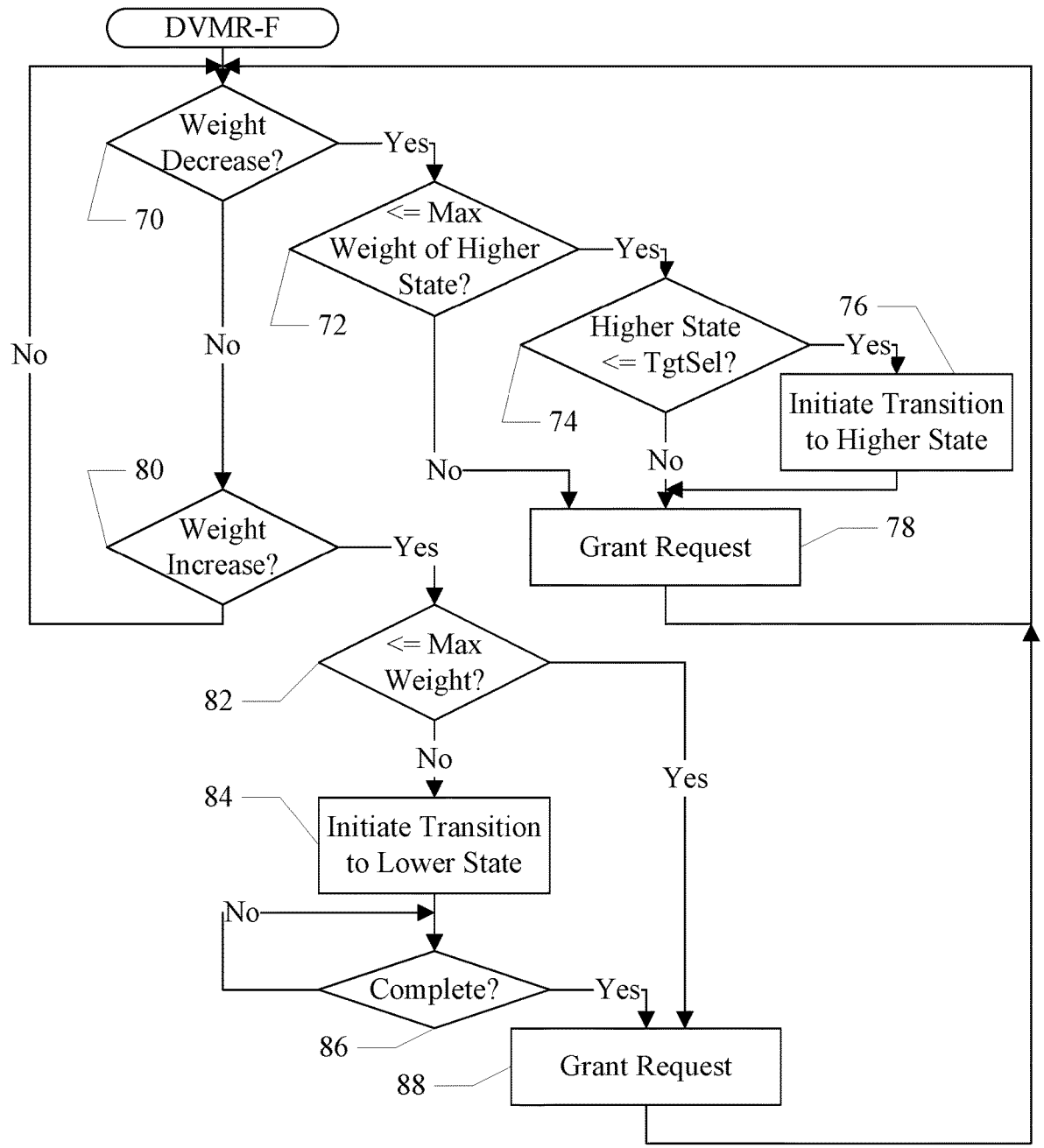
FIG. 5 is a flowchart illustrating operation of one embodiment of the APSC to perform frequency recovery.

Turning next to FIG. 5, a flowchart is shown illustrating operation of one embodiment of the APSC 16 to implement DVMR-F. The operation illustrated in FIG. 5 may be implemented in parallel with, and/or integrated with, the operation shown in FIG. 4. While the blocks are shown in a particular order for ease of understanding, other orders may be used. Blocks may be performed in parallel in the combinatorial logic circuitry in the APSC 16. Blocks, combinations of blocks, and/or the flowchart as a whole may be pipelined over multiple clock cycles. The APSC 16 may be configured to implement the operation shown in FIG. 5.

The operation of FIG. 5 may be implemented in response to a request from one of the processors 28 to transition between modes (and/or processor power up/power down requests). If the requested transition causes a decrease in weight (decision block 70, "yes" leg), the control circuit 42 may be configured to determine if the decreased weight would permit the CPU complex 14 to operate at a higher DVFM state (e.g., a state having a higher performance operating point that has a higher operating frequency at the same power supply voltage magnitude, a higher power supply voltage magnitude and a higher frequency, etc.). In the illustrated embodiment, the control circuit 42 may be configured to determine whether or not a higher state is possible by comparing the total weight after granting the request to the maximum weight of the higher state (decision block 72). If so (decision block 72, "yes" leg) and the higher state is less than or equal to the target state indicated in the register 44A (decision block 74, "yes" leg), the control circuit 42 may be configured to initiate a transition to the higher state (block 76). For example, the control circuit 42 may be configured to update the register 44B to select the higher state. The corresponding frequency and voltage may be transmitted to the PMGR 32 and the clock control unit to cause the transition to the new operating point. In an embodiment, the control circuit 42 may be configured to transmit a region select that results in a power supply voltage magnitude reduction of zero until the transition is complete and stable. In either case, the control circuit 42 may be configured to grant the request from the processor 28 (block 78), because the current configuration may be safe to operate the reduced load.

If the request causes an increase in weight (decision block 80, "yes" leg), the control circuit 42 may be configured to compare the increased weight to the max weight of the current state (decision block 82). If the increased weight is not less than or equal to the max weight (decision block 82, "no" leg), the control circuit 42 may be configured to initiate a transition to a lower state (block 84). Initiating the transition to the lower state may also include checking that the increased weight is less than or equal to the max weight in the lower state. If not, an even lower state may be selected. The control circuit 42 may be configured to wait for the transition to be complete (decision block 86), and may grant the request (block 88). If the increased weight is less than or equal to the max weight (decision block 82, "yes" leg), the control circuit 42 may be configured to grant the request (block 88).

Figure 6:
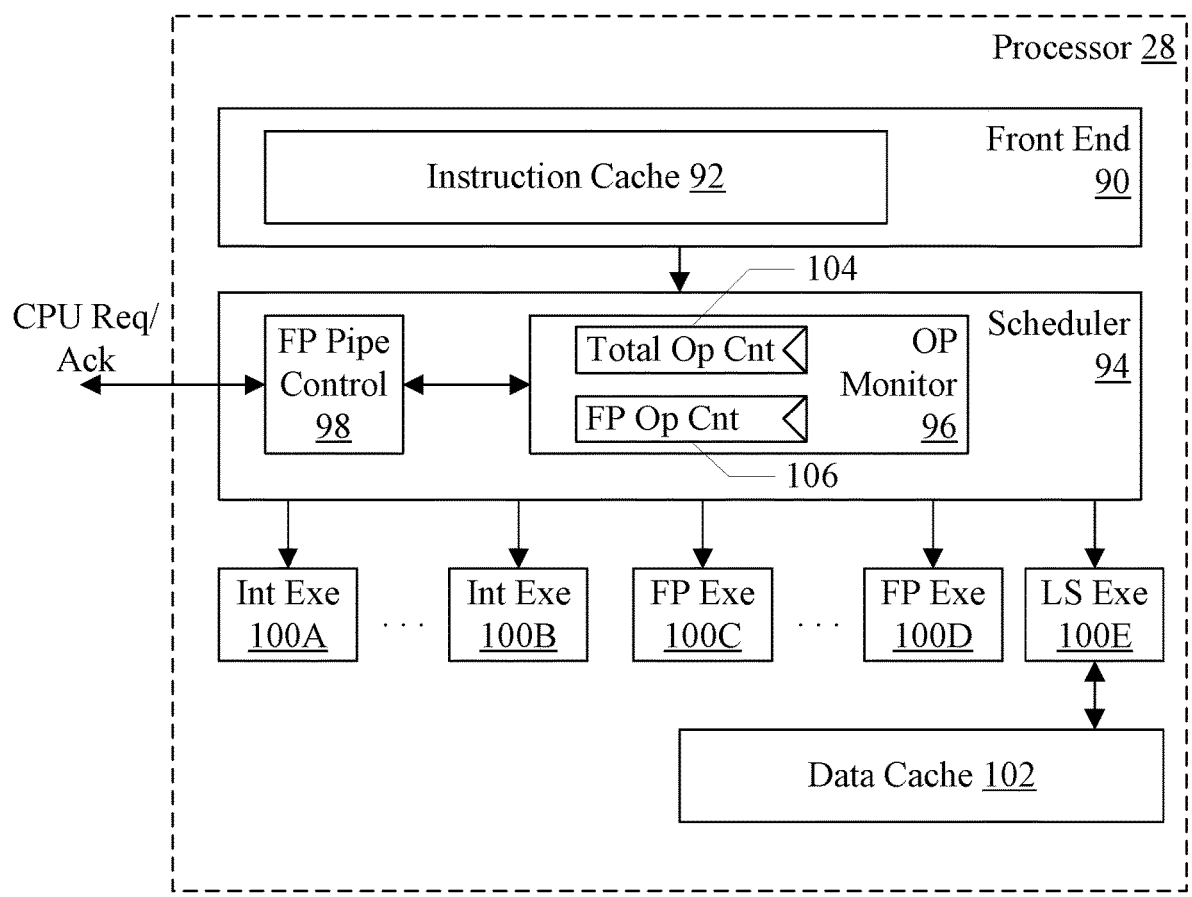
FIG. 6 is a block diagram of one embodiment of a processor shown in FIG. 2.

Turning next to FIG. 6, a block diagram of a portion of one embodiment of one of the processors 28 is shown. In the embodiment of FIG. 6, the processor 28 includes a front end 90 that includes an instruction cache 92, a scheduler circuit 94 that includes an op monitor circuit 96 and a floating point (FP) pipe control circuit 98, a set of execution pipelines such as pipelines 100A-100E, and a data cache 102. The front end 90 may be coupled to the scheduler circuit 94, which may be coupled to the execution pipelines 100A-100E. The execution pipeline 100E may be coupled to the data cache 102. The op monitor 96 may be coupled to the FP pipe control circuit 98, which may be coupled to the CPU request/acknowledge interface to the APSC 16.

The front end 90 may be configured to fetch instructions from the instruction cache 92. The front end 90 may include various branch prediction mechanisms, next fetch predictors, and/or other speculative instruction stream mechanisms that permit fetching down a speculative instruction path to provide instructions for execution. The front end 90 may include decode circuitry as well to decode the instructions, in some embodiments. An instruction stream may generally be a set of instructions arranged for execution to accomplish an overall task. The stream may be executed out-of-order if the processor 28 implements out of order processing. The stream may not necessarily be stored at consecutive addresses in memory, as branches and the like may cause fetching to continue at different addresses than the next sequential address. The front end 90 may further include decode circuitry and/or microcoding to decode the fetched instructions into ops, as mentioned below. In embodiments that implement register renaming, the front end 90 may be configured to perform the register renaming.

An instruction may be an executable entity defined in an instruction set architecture implemented by the processor 28. There are a variety of instruction set architectures in existence (e.g. the x86 architecture original developed by Intel, ARM from ARM Holdings, Power and PowerPC from IBM/Motorola, etc.). Each instruction is defined in the instruction set architecture, including its coding in memory, its operation, and its effect on registers, memory locations, and/or other processor state. A given implementation of the instruction set architecture may execute each instruction directly, although its form may be altered through decoding and other manipulation in the processor hardware. Another implementation may decode at least some instructions into multiple instruction operations for execution by the execution units in the processor 28. Some instructions may be microcoded, in some embodiments. Accordingly, the term "instruction operation" may be used herein to refer to an operation that an execution pipeline in the processor 28 is configured to execute as a single entity. Instructions may have a one to one correspondence with instruction operations, and in some cases an instruction operation may be an instruction (possibly modified in form internal to the processor 28). Instructions may also have a one to more than one (one to many) correspondence with instruction operations. An instruction operation may be more briefly referred to herein as an "op."

The scheduler circuit 94 (or more briefly, the scheduler 94), may be coupled to receive ops from the front end 90 and may be configured to schedule ops for execution by the execution pipelines 100A-100E. Generally, the scheduler 94 may be configured to monitor the ops held by the scheduler 94, identifying ops for which the input operands are "ready" and scheduling the oldest ops that are ready and for which execution resources (e.g. execution pipelines) are available to execute the ops. Particularly, based on the execution latency of a given op, the scheduler 94 may determine when the ops that depend on the output register of the given op are ready (at least with respect to the dependency on the given op). The dependent ops may be scheduled, at the earliest, such that they arrive at the execution stage or other data-forwarding stage at a time when the input operands may be forwarded. There may be one or more pipeline stages between issue and execution/forwarding (e.g. a register file read stage) and the ops may be scheduled based on the pipeline delays as well as the execution latency of the ops providing the operands.

The scheduler 94 may be further configured to monitor the execution of high power-consuming ops. In the present embodiment, floating point (FP) ops may be considered high power-consuming ops. Other embodiments may define other ops, or subsets of ops, to be high power-consuming ops. Accordingly, the processor 28 may include modes for execution of the FP ops. Other ops, such as integer ops or memory (load/store) ops, may not be high power-consuming ops and thus may not be regulated for purposes of limiting power supply load. The FP control circuit 98 may be configured to implement the modes. In an embodiment, there may be three modes: powered off, powered on with one FP execution pipeline enabled, and powered on with all FP execution pipelines enabled. In other embodiments, there may be additional modes for additional numbers of pipelines (but fewer than all pipelines) enabled. Generally, the FP pipeline control circuit 98 may be configured to limit the issuance of FP ops to the FP execution pipelines 100C-100D that are enabled. Additionally, the FP pipe control circuit 98 may be configured to communicate the mode change requests (increased weight or decreased weight) and to enable/disable FP execution pipelines responsive the mode change grants.

The op monitor circuit 96 may be configured to detect whether or not the modes should be increased or decreased. For example, the op monitor circuit 96 may maintain a total op issue count and an FP op issue count (e.g. registers 104 and 106 in FIG. 6). Once the total op issue count reaches a certain value, the op monitor may compare the FP op count to one or more thresholds that indicate that the number of enabled FP execution pipelines should be increased. For example, if the number of FP ops is greater than a specified threshold, the number of enabled FP execution pipelines should be increased to improve performance. If the number of FP ops is less than a specified threshold, performance may not be decreased significantly by disabling one or more of FP execution pipelines. The op monitor circuit 96 may communicate the potential mode change to the FP pipe control circuit 98 and may reset the counts in the registers 104 and 106. In an embodiment, the thresholds may be programmable in the op monitor circuit 96 as well. Separate thresholds for enabling more FP execution pipelines and disabling FP execution pipelines may be implemented to provide hysteresis in the mode change requests.

Since the FP op issue count is compared to the thresholds when the total count reaches a certain level, the comparisons may be effectively determining a relative number of FP ops in the instruction stream being executed. Other embodiments may compare the issue counts or determine the relative number of FP ops to the total number in other ways.

The execution pipelines 100A-100E may include the circuitry configured to execute ops issued by the scheduler 94. Thus, the circuitry may include operand fetch (e.g. from one or more register files, not shown), performing the operations specified for each op, and forwarding results for storage. In various embodiments, the execution pipelines 100A-100E may perform computational operations such as logical operations, mathematical operations, or bitwise operations, for example, for an associated type of operand. More specifically, the integer execution pipelines 100A-100B may perform computational operations that involve integer operands, the floating-point execution pipelines may perform computational operations that involve floating-point operands, and vector execution pipelines may perform computational operations that involve vector operands. Any suitable configurations maybe employed for the execution units, depending on the particular configuration of architectural and performance parameters governing a particular processor design. Additionally, execution pipelines may include pipelines to perform memory ops (e.g. load ops and/or store ops), such as the execution pipeline 100E. The execution pipeline 100E may be configured to access the data cache 102 to perform the memory operations. Accordingly, an op type may be based on the operation to be performed (e.g. memory versus arithmetic/logic) and/or the type of operand (integer, floating point, etc.).

The number of execution pipelines provided for each op type may vary from one to multiple, and may vary from implementation to implementation. Thus, there may be one or more integer execution pipelines, one or more floating point execution pipelines, one or more vector execution pipelines, one or more load/store execution pipelines, etc. in various embodiments.

Generally, a scheduler may be any circuitry configured to receive ops and schedule the ops for execution. A scheduler may be centralized (e.g. a centralized scheduler or centralized reservation station) that schedules ops for execution in all execution pipelines. A scheduler may also be decentralized (e.g. reservation stations) that receive and schedule ops of a particular type and/or ops for a particular execution pipeline. Any scheduler may be implemented in various embodiments.

The instruction cache 92 and the data cache 102 may be illustrative of any caching structure. For example, the illustrated caches 92 and 102 may be a Harvard architecture (separate instruction cache for instruction fetching and data cache for data read/write for memory-referencing ops). In other embodiments, the caches 92 and 102 may be merged as a shared instruction and data cache. Any capacity and configuration (e.g. set associative, direct mapped, fully associative, etc.) may be used.

Figure 7:
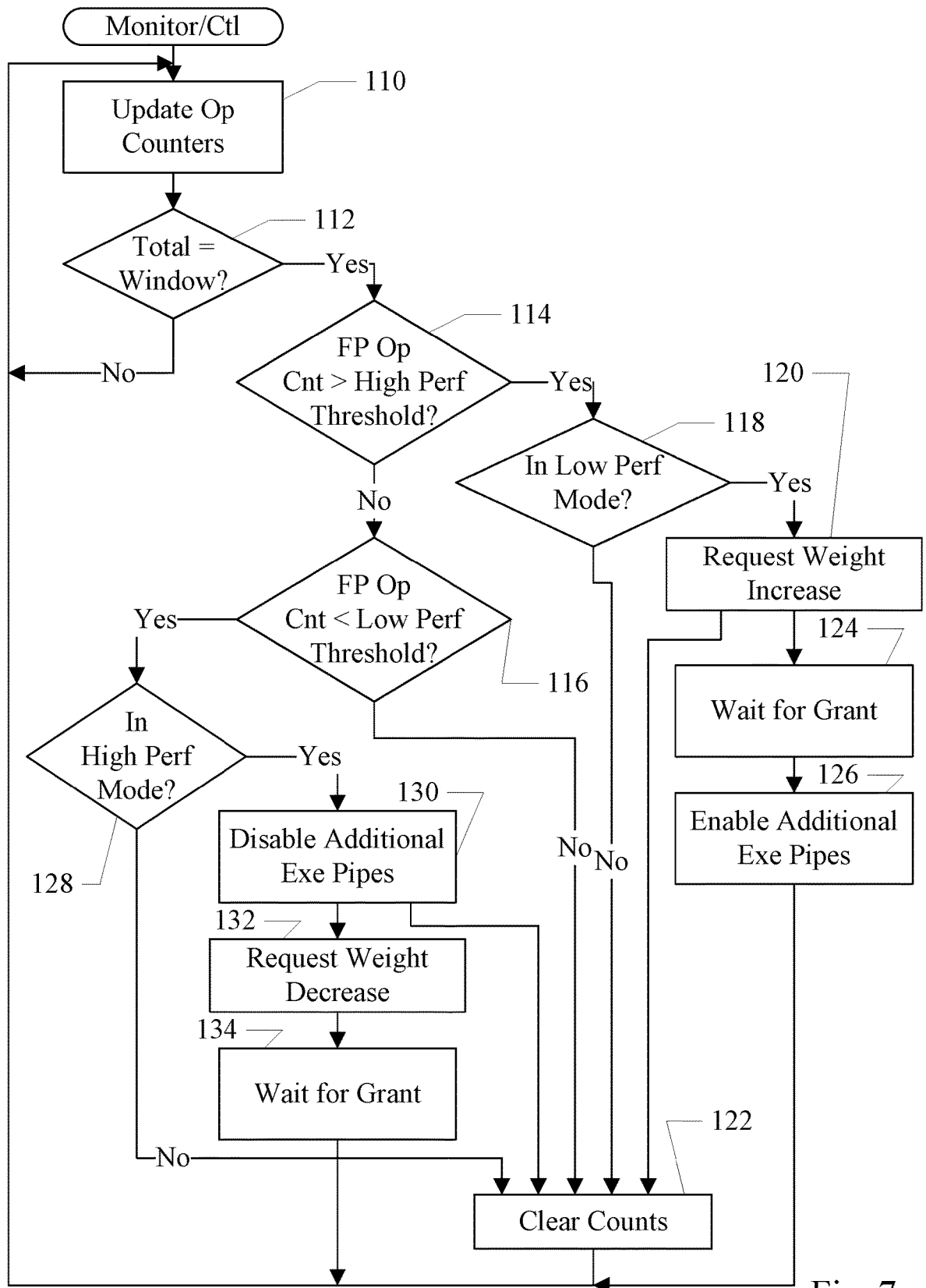
FIG. 7 is a block diagram illustrating operation of one embodiment of op monitor and pipe control circuitry shown in FIG. 6.

Turning now to FIG. 7, a flowchart is shown illustrating operation of one embodiment of the op monitor circuit 96 and the FP pipe control circuit 98. While the blocks are shown in a particular order for ease of understanding, other orders may be used. Blocks may be performed in parallel in the combinatorial logic circuitry in the op monitor circuit 96 and/or the FP pipe control circuit 98. Blocks, combinations of blocks, and/or the flowchart as a whole may be pipelined over multiple clock cycles. The op monitor circuit 96 and/or the FP pipe control circuit 98 may be configured to implement the operation shown in FIG. 7.

The op monitor circuit 96 may be configured to update the op counters based on the number of ops issued and the number of FP ops issued, respectively (block 110). If the total number of ops issued matches a window in which the FP op issue count is to be evaluated (decision block 112, "yes" leg), the op monitor circuit 96 may be configured to compare the FP op issue count to the high performance and low performance thresholds (decision blocks 114 and 116). If the FP op issue count is greater than the high performance threshold (decision block 114, "yes" leg), the op monitor circuit 96 may indicate to the FP pipe control circuit 98 that the mode may be increased to the high performance mode. If the current mode of the processor 28 is the low performance mode (e.g. only one FP execution pipeline enabled) (decision block 118, "yes" leg), the FP pipe control circuit 98 may be configured to transmit a request to increase the weight of the processor 28 so the mode may be changed to the high performance mode (block 120). In either case, the op monitor circuit 96 may be configured to clear op issue counts (block 122). If the FP pipe control circuit 98 has transmitted the weight increase request, the FP pipe control circuit 98 may be configured to wait for the grant from the APSC 16 (block 124), and responsive to the grant may enable the additional FP execution pipeline(s) (block 126).

If the FP op issue count is less than the low performance threshold (decision block 116, "yes" leg), the op monitor circuit 96 may indicate to the FP pipe control circuit 98 that the mode may be decreased to the low performance mode. If the current mode of the processor 28 is the high performance mode (e.g. all FP execution pipelines enabled) (decision block 128, "yes" leg), the FP pipe control circuit 98 may be configured to disable the additional FP execution pipelines (block 130). The FP pipe control circuit 98 may be configured to request a decrease of the weight of the processor 28 (block 132) and wait for the grant from the APSC 16 (block 134). In either case, the op monitor circuit 96 may be configured to clear op issue counts (block 122).

Figure 8:
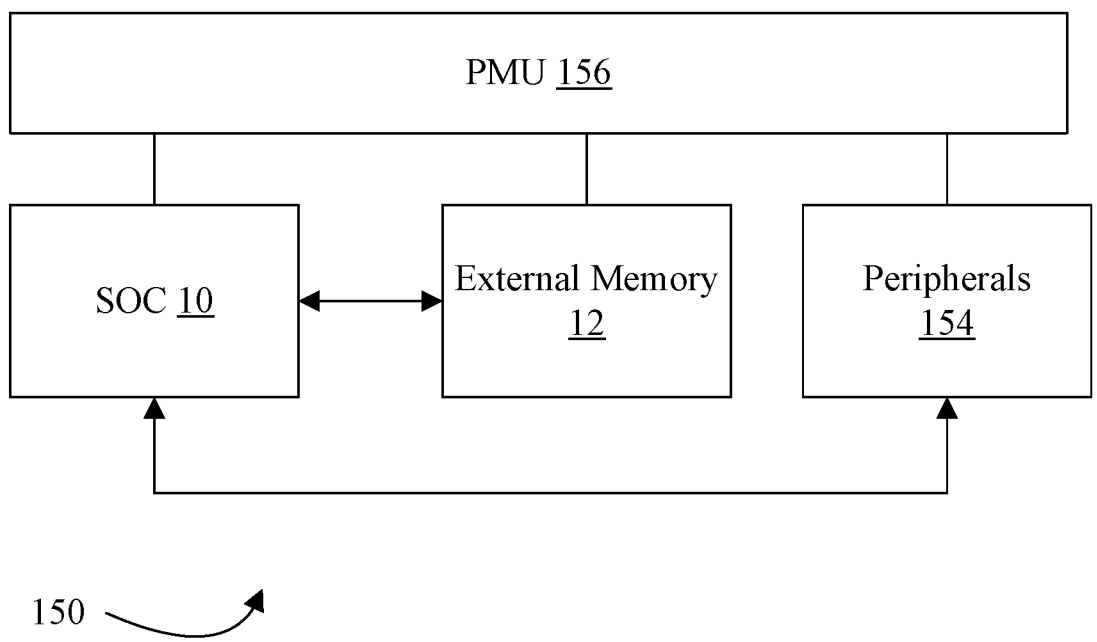
FIG. 8 is a block diagram of one embodiment of a system.

Turning next to FIG. 8, a block diagram of one embodiment of a system 150 is shown. In the illustrated embodiment, the system 150 includes at least one instance of the SOC 10 coupled to one or more peripherals 154 and the external memory 12. The PMU 156 is provided which supplies the supply voltages to the SOC 10 as well as one or more supply voltages to the memory 12 and/or the peripherals 154. In some embodiments, more than one instance of the SOC 10 may be included (and more than one memory 12 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as wifi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

The external memory 12 may include any type of memory. For example, the external memory 12 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g. LPDDR, mDDR, etc.), etc. The external memory 12 may include one or more memory modules to which the memory devices are mounted, such as single inline memory modules (SIMMs), dual inline memory modules (DIMMs), etc. Alternatively, the external memory 12 may include one or more memory devices that are mounted on the SOC 10 in a chip-on-chip or package-on-package implementation.

Numerous variations and modifications will become apparent to those skilled in the art once the above disclosure is fully appreciated. It is intended that the following claims be interpreted to embrace all such variations and modifications.

What is claimed is:

1. A system comprising:
a plurality of instances of a component, wherein each instance is operable in a plurality of modes, wherein a first mode of the plurality of modes presents a larger power supply load than other modes of the plurality of modes, and wherein a voltage margin to be included in a power supply voltage magnitude requested for the plurality of instances is determined based on each instance concurrently operating in the first mode; and
a control circuit coupled to the plurality of instances of the component, wherein the control circuit is configured to recover a portion of the voltage margin responsive to detecting that one or more of the plurality of instances of the component are operating in one or more other modes of the plurality of modes, wherein the portion is dependent on a difference in a first amount of dynamic loss in the power supply voltage magnitude that is possible when the plurality of instances are operating in the first mode and a second amount of dynamic loss in the power supply voltage magnitude that is possible when one or more of the plurality of instances are operating in the one or more other modes, and wherein a first instance of the plurality of instances is configured to request a transition from a current mode of the one or more other modes to a requested mode of the plurality of modes, and wherein a weight is assigned to each of the plurality of modes, and wherein the control circuit is configured to sum the weights for the plurality of instances based on a current mode for each of the plurality of instances, and wherein the control circuit is configured to ensure that the sum of the weights does not exceed a limit that is based on a current requested supply voltage and a current clock frequency supplied to the plurality of instances of the component wherein the control circuit is configured to grant the request responsive to a sum of a first weight corresponding to the requested mode and current weights for other ones of the plurality of instances not exceeding the limit.

2. The system as recited in claim 1 wherein the control circuit is configured to recover the portion of the voltage margin by reducing the power supply voltage magnitude requested for the plurality of instances while operating the plurality of instances at a same clock frequency.

3. The system as recited in claim 1 wherein the control circuit is configured to recover the portion of the voltage margin by increasing a clock frequency at which the plurality of instances are operating while maintaining a same requested power supply voltage magnitude.

4. The system as recited in claim 1 wherein a second instance of the component is configured to request to transition to a second requested mode of the plurality of modes, and wherein the control circuit is configured to determine a second portion of the voltage margin that is recoverable when the second instance is operating in the second requested mode.

5. The system as recited in claim 4 wherein the control circuit is configured to grant the request to transition to the second requested mode responsive to the second portion being greater than the portion.

6. The system as recited in claim 5 wherein the control circuit is configured to recover the second portion subsequent to granting the request to transition to the second requested mode.

7. The system as recited in claim 4 wherein the control circuit is configured recover the second portion prior to granting the request to transition to the second requested mode responsive to the second portion being less than the portion.

8. A system comprising:
a plurality of instances of a component, wherein each instance is operable in a plurality of modes, wherein a first mode of the plurality of modes presents a larger power supply load than other modes of the plurality of modes, and wherein a voltage margin to be included in a power supply voltage magnitude requested for the plurality of instances is determined based on each instance concurrently operating in the first mode; and
a control circuit coupled to the plurality of instances of the component, wherein the control circuit is configured to recover a portion of the voltage margin responsive to detecting that one or more of the plurality of instances of the component are operating in one or more other modes of the plurality of modes, wherein the portion is dependent on a difference in a first amount of dynamic loss in the power supply voltage magnitude that is possible when the plurality of instances are operating in the first mode and a second amount of dynamic loss in the power supply voltage magnitude that is possible when one or more of the plurality of instances are operating in the one or more other modes, and wherein a weight is assigned to each of the plurality of modes, and wherein the control circuit is configured to sum the weights for the plurality of instances based on a current mode for each of the plurality of instances, and wherein the control circuit is configured to ensure that the sum of the weights does not exceed a limit corresponding to a current requested supply voltage magnitude and a current clock frequency for the plurality of instances, and wherein a first instance of the component is configured to request to transition to a requested mode of the plurality of modes, and wherein the control circuit is configured to deny the request responsive to the sum of a first weight corresponding to the requested mode and current weights for other ones of the plurality of instances exceeding the limit.

9. The system as recited in claim 8 wherein the control circuit is configured to grant the request responsive to the sum of the first weight and the current weights for other ones of the plurality of instances not exceeding the limit.

10. The system as recited in claim 8 wherein the control circuit is configured to recover the portion of the voltage margin by reducing the power supply voltage magnitude requested for the plurality of instances while operating the plurality of instances at a same clock frequency.

11. The system as recited in claim 8 wherein the control circuit is configured to recover the portion of the voltage margin by increasing a clock frequency at which the plurality of instances are operating while maintaining a same requested power supply voltage magnitude.

12. The system as recited in claim 8 wherein a second instance of the component is configured to request to transition to a second requested mode of the plurality of modes, and wherein the control circuit is configured to determine a second portion of the voltage margin that is recoverable when the second instance is operating in the second requested mode.

13. The system as recited in claim 12 wherein the control circuit is configured to grant the request to transition to the second requested mode responsive to the second portion being greater than the portion.

14. The system as recited in claim 13 wherein the control circuit is configured to recover the second portion subsequent to granting the request to transition to the second requested mode.

15. The system as recited in claim 12 wherein the control circuit is configured recover the second portion prior to granting the request to transition to the second requested mode responsive to the second portion being less than the portion.

16. A system comprising:
a plurality of instances of a component, wherein each instance is operable in a plurality of modes, wherein a first mode of the plurality of modes presents a larger power supply load than other modes of the plurality of modes, and wherein a voltage margin to be included in a power supply voltage magnitude requested for the plurality of instances is determined based on each instance concurrently operating in the first mode; and
a control circuit coupled to the plurality of instances of the component, wherein a weight is assigned to each of the plurality of modes, and wherein the control circuit is configured to sum the weights for the plurality of instances based on a current mode for each of the plurality of instances, and wherein the control circuit is configured to ensure that the sum of the weights does not exceed a limit corresponding to a current requested supply voltage magnitude and a current clock frequency for the plurality of instances, and wherein a first instance of the component is configured to request to transition to a requested mode of the plurality of modes, and wherein the control circuit is configured to deny the request responsive to the sum of a first weight corresponding to the requested mode and current weights for other ones of the plurality of instances exceeding the limit.

17. The system as recited in claim 16 wherein the control circuit is configured to grant the request responsive to the sum of the first weight corresponding to the requested mode and current weights for other ones of the plurality of instances not exceeding the limit.

* * * * *